United States Patent
Parikh et al.

(10) Patent No.: US 9,681,310 B2
(45) Date of Patent: Jun. 13, 2017

(54) STUDIO-TRANSMITTER LINK (STL) SYSTEMS AND METHODS

(75) Inventors: Keyur Ranchhod Parikh, Mason, OH (US); Junius Adonis Kim, Cincinnati, OH (US)

(73) Assignee: GatesAir, Inc., Mason, OH (US)

( * ) Notice: Subject to any disclaimer, the term of this patent is extended or adjusted under 35 U.S.C. 154(b) by 1504 days.

(21) Appl. No.: 13/246,241

(22) Filed: Sep. 27, 2011

(65) Prior Publication Data

US 2013/0077504 A1    Mar. 28, 2013

(51) Int. Cl.
*H04W 24/00* (2009.01)
*H04H 60/06* (2008.01)
*H04H 60/11* (2008.01)
*H04H 60/02* (2008.01)

(52) U.S. Cl.
CPC .......... *H04W 24/00* (2013.01); *H04H 60/06* (2013.01); *H04H 60/11* (2013.01); *H04H 60/02* (2013.01)

(58) Field of Classification Search
CPC ......... H04L 45/22; H04L 45/28; H04L 43/08; H04L 43/16; H04W 40/00; H04W 24/00; H04H 60/11; H04H 60/06; H04H 60/02
USPC .... 370/216, 225, 228, 241, 252, 310, 310.1, 370/310.2, 328; 455/403, 422.1, 426.2, 455/436, 438
See application file for complete search history.

(56) References Cited

U.S. PATENT DOCUMENTS

| | | | |
|---|---|---|---|
| 4,896,371 A * | 1/1990 | Kahn | 455/105 |
| 6,680,977 B2 | 1/2004 | Collins et al. | |
| 7,492,792 B2 | 2/2009 | Sano et al. | |
| 2009/0067323 A1 * | 3/2009 | Matsushima et al. | 370/225 |
| 2009/0190478 A1 * | 7/2009 | Li et al. | 370/238 |

* cited by examiner

Primary Examiner — Obaidul Huq
(74) Attorney, Agent, or Firm — Tarolli, Sundheim, Covell & Tummino LLP

(57) ABSTRACT

Studio-transmitter link (STL) systems and methods are disclosed. In one embodiment, a STL system is provided that includes a STL transmitter comprising a first STL transmitter interface that transmits program content over a first transmission path to a STL receiver, and a second STL transmitter interface that transmits program content over a second transmission path to the STL receiver.

20 Claims, 3 Drawing Sheets

STUDIO-TRANSMITTER LINK (STL) SYSTEMS AND METHODS

TECHNICAL FIELD

The present invention relates generally to communications and, more specifically, to studio-transmitter link (STL) systems and methods.

BACKGROUND

Traditionally a radio Studio to Transmitter Link (STL) system encodes program content at a studio site and transports this content wirelessly over a FCC licensed frequency to a far-end transmitter site. This wireless radio link is unidirectional. A typical application is for a commercial radio station whose main transmitter tower is located away from the studio or content production site. This radio station can use a radio STL system to transport program content. In the United States, the FCC provides a licensed radio band between 944 and 960 MHz specifically for this purpose (FCC part 74, Subpart E—Aural Broadcast Auxiliary Stations). Depending on the locations to be connected, a station may choose either a point to point (PTP) link on another special radio frequency, or a newer all-digital wired link via a dedicated T1 or E1 (or larger-capacity) line. Radio links can also be digital, analog, or a hybrid of the two. Even on older all-analog systems, multiple audio and data channels can be sent using subcarriers. As with any communication system, primary link degradation or failure can occur due to equipment failure or environmental conditions.

SUMMARY

In accordance with an aspect of the present invention, a studio transmitter link (STL) system is provided. The STL system comprises a STL transmitter comprising a first STL transmitter interface that transmits program content over a first transmission path to a STL receiver, and a second STL transmitter interface that transmits program content over a second transmission path to the STL receiver.

In accordance with another aspect of the invention, a STL system is provided that includes a STL transmitter. The STL transmitter comprises a first STL transmitter interface that transmits program content over a main transmission path to a STL receiver and a second STL transmitter interface that transmits program content over an auxiliary transmission path to the STL receiver. The program content is transmitted over the main transmission path during normal transmissions and the program content is transmitted over the auxiliary transmission path in the event of a failover condition of the main transmission path. The STL transmitter further comprises a transmitter control logic component that receives quality metrics associated with transmissions of program content and adjusts transmission parameters if the quality metrics associated with the transmission of program content is below a first predetermined threshold.

In accordance with yet another aspect of the invention, a method of transmitting program content within a studio transmitter link (STL) system is provided. The method comprises transmitting program content from a STL transmitter to a STL receiver over a first transmission path and transmitting program content from a STL transmitter to a STL receiver over a second transmission path in the event of a failover condition of the first transmission path. The first transmission path is one of a radio frequency (RF) communication link and an Internet Protocol (IP) communication link and the second transmission path is the other of a RF communication link and an IP communication link.

DETAILED DESCRIPTION

Studio-transmitter link (STL) systems and methods are disclosed. In one system, an STL transmitter transmits program content over a main transmission path and an auxiliary transmission path to an STL receiver. The program content can be digital or analog audio and/or video data that is captured in a studio and provided to the STL transmitter for transmitting to the STL receiver that resides at a transmission site. The program content can be transmitted over the main transmission path during normal transmissions and over the auxiliary transmission path in the event of a failover condition of the main transmission path. Alternatively, the STL transmitter can transmit program content concurrently over the main transmission path and the auxiliary transmission path. The STL receiver can decide which path to employ to decode the program content based on the quality of the transmissions, or the STL transmitter can include information along with the program content on which path to employ to decode the program content.

Figure 1:
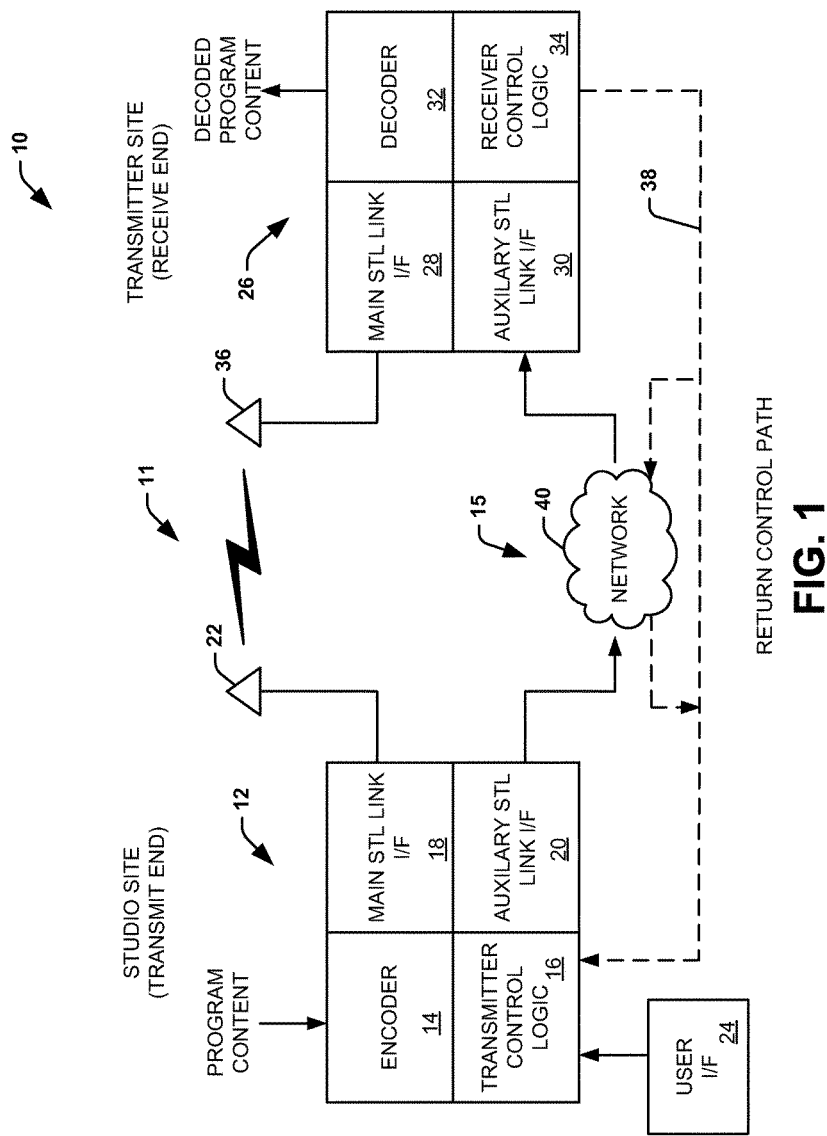
FIG. 1 illustrates a block diagram of a studio transmitter link (STL) system according to an aspect of the invention.

FIG. 1 illustrates an example of a STL system 10 according to an aspect of the invention. The system 10 comprises a studio site unit, which is an STL transmitter 12 and a corresponding transmitter site unit, which is an STL receiver 26. There are two communication paths in the forward direction for program content transport and one communication path in the reverse direction for providing feedback of the forward path's performance. The two forward direction communication paths comprise a main transmission path 11 that in the present example is an RF path and is considered a primary transmission path and an auxiliary transmission path 15, which can be an optional internet protocol (IP) based path and is considered as a backup transmission path. However, it is to be appreciated that the primary path could be an IP based path and the auxiliary transmission path could be a RF path based on a desired STL system configuration. Additionally, an IP path can be employed as both as a forward based path and a feedback path.

The STL transmitter 12 includes a main transmitter STL link interface 18 coupled to an antenna 22 for transmitting RF communications over the main transmission path 11 to a main receiver STL link interface 28 via an antenna 36 of the STL receiver 26. The STL transmitter 12 also includes an auxiliary transmitter STL link interface 20 coupled to a network 40 for transmitting packet communications of the program content over the auxiliary transmission path 15 to an auxiliary receiver STL link interface 30 via the network 40. A return control path 38 provides a feedback loop from a receiver control logic component 34 of the STL receiver 26 back to a transmitter control logic component 16 of the STL transmitter 12 to assess the quality of the forward paths and the actions that needs to be taken to maintain a desired quality and a desired payload data rate of the program content transport. The return control path 38 can be a separate dedicated path that is, for example, an IP link, an optical link, a RF link or any other communication link. Alternatively, the return control path can be the same path as the auxiliary transmission path over the network 40, such that the auxiliary communication path can be bidirectional and provide both communication of program content and feedback on quality of the program content transmissions.

As illustrated in FIG. 1, analog or digital program content associated with the studio program is ingested into the STL transmitter 12. The program content is then sampled and digitized by an encoder 14 before applying a compression algorithm on the program content by the encoder 14. The final program content is then framed up and sent over one or both the main transmission path 11 and the auxiliary transmission path 15 based on decisions by the transmitter control logic component 16. At the STL receiver 26, the encoded program content is received from one or both of the main and auxiliary transmission paths 11 or 15. The program content then goes through the process of decoding by a decoder 32 of the STL receiver 26 to provide decoded program content to transmitter end equipment (not shown) at the transmitter site for broadcast. The receiver control logic component 34 is continuously monitoring the STL receiver main link quality performance by examining the SNR (Signal to Noise Ratio) and BER (Bit Error Rate). These performance metrics are sent to the STL transmitter's transmitter control logic component 16 over the return control path 38, which executes the logic to scale the transmission over the main transmission path 11 during normal transmissions and/or perform a failover to the auxiliary transmission path 15 in the event of a failover condition.

It is to be appreciated that in a digital transmission system (e.g., digital radio system), the receiver Bit Error Rate (BER) is strongly correlated to the received SNR. The SNR required to keep a particular BER depends on the modulation type and channel forward error correction (FEC) coding rate or percentage of Forward Error Correction (FEC) information carried in the signal. In the STL system 10, Quadrature Amplitude Modulation (QAM) orders of 256, 128, 64, and 32 can be supported and along with code rates that can vary from 92 to 75% (amount of payload data vs. total data which includes FEC). A higher QAM order or code rate requires a greater SNR to maintain a particular BER. For example, all other parameters being equal, a change from 256 to 128 QAM requires 3 dB less SNR to maintain the same BER performance. This QAM changes also results in ⅞ less data being transported.

It is also to be appreciated that the SNR can also be changed by changing the transmit power. Assuming the transmitter linearity characteristics are independent of power, a 3 dB change in power output results in a 3 dB change in SNR. Therefore, in an aspect of the invention, the STL transmitter 12 first attempts to increase the RF transmit power up to improve the RF link quality to an allowable maximum power level. Once the allowable maximum power level has been reached, the STL transmitter 12 can attempt to improve the link quality by lowering the channel payload data rate, for example, by scaling down on the QAM modulation level and/or increasing the channel coding rate and/or reducing the amount of channels transmitted.

It is further to be appreciated that as the forward channel payload data rate is reduced, the audio and/or video bit rate needs to be adjusted accordingly. In accordance with another aspect of the invention, the STL transmitter 12 prioritizes the reduction processes by keeping to the same encoding algorithm, but scaling down on the program content sampling rate by the encoder 14. For example, if a program channel is originally set to sample at 48 kHz, the encoder 14 of the STL transmitter 12 will first try to scale the sampling rate down to 44.1 and 32 kHz before attempting to change to a different encoding algorithm that provides better compression ratio.

In an aspect of the invention, a user interface 24 is provided for allowing a user to define quality metrics to be monitored, to define acceptable quality threshold levels and define payload data rate adjustment profiles. For example, the user can define that BER is to be monitored and if the BER falls below a first predetermined threshold, then transmission adjustment parameters are to be made to modify the payload data rate. The BER and the BER threshold can be defined at the STL receiver 26. The user can define the type of modifications to be performed and the increments in which the modifications are to be performed based on a user defined transmission parameter adjustment profile.

For example, power is to be increased, QAM is to be reduced, FEC is to be increased, sample rate increased and/or number of channels transmitted can be reduced in scaled incremental steps for each of the transmission parameters to be adjusted for the main transmission path 11 to increase the power and/or reduce the payload data rate. Furthermore, the user can define if the data rate falls below a second predetermined threshold, then transmission can be sent over the auxiliary transmission path until the data rate is increased above the second predetermined threshold, for example, as a result in an increase in the quality of the transmissions over the main transmission path. Alternatively, the user can define that the auxiliary transmission path is to be employed by the receiver if the data rate of the auxiliary transmission path is higher than the data rate of the main transmission path. Additionally, the user can define that the payload data rate can be increased if the payload data rate is below a predetermined data rate threshold but the BER is above the first predetermined threshold and the payload data rate is below a desired payload data rate.

Figure 2:
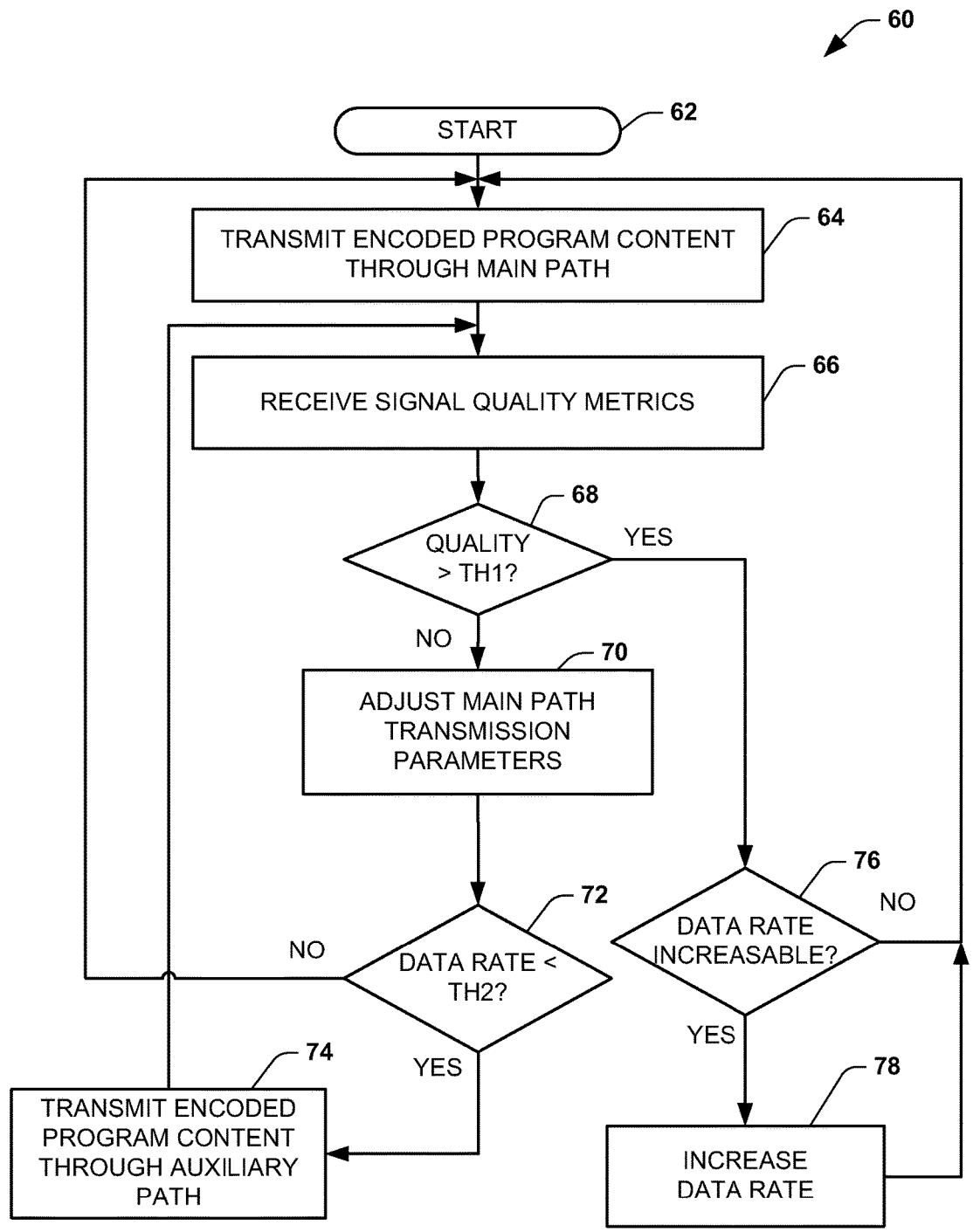
FIG. 2 illustrates a method for STL transmissions within a STL system according to an aspect of the invention.
Figure 3:
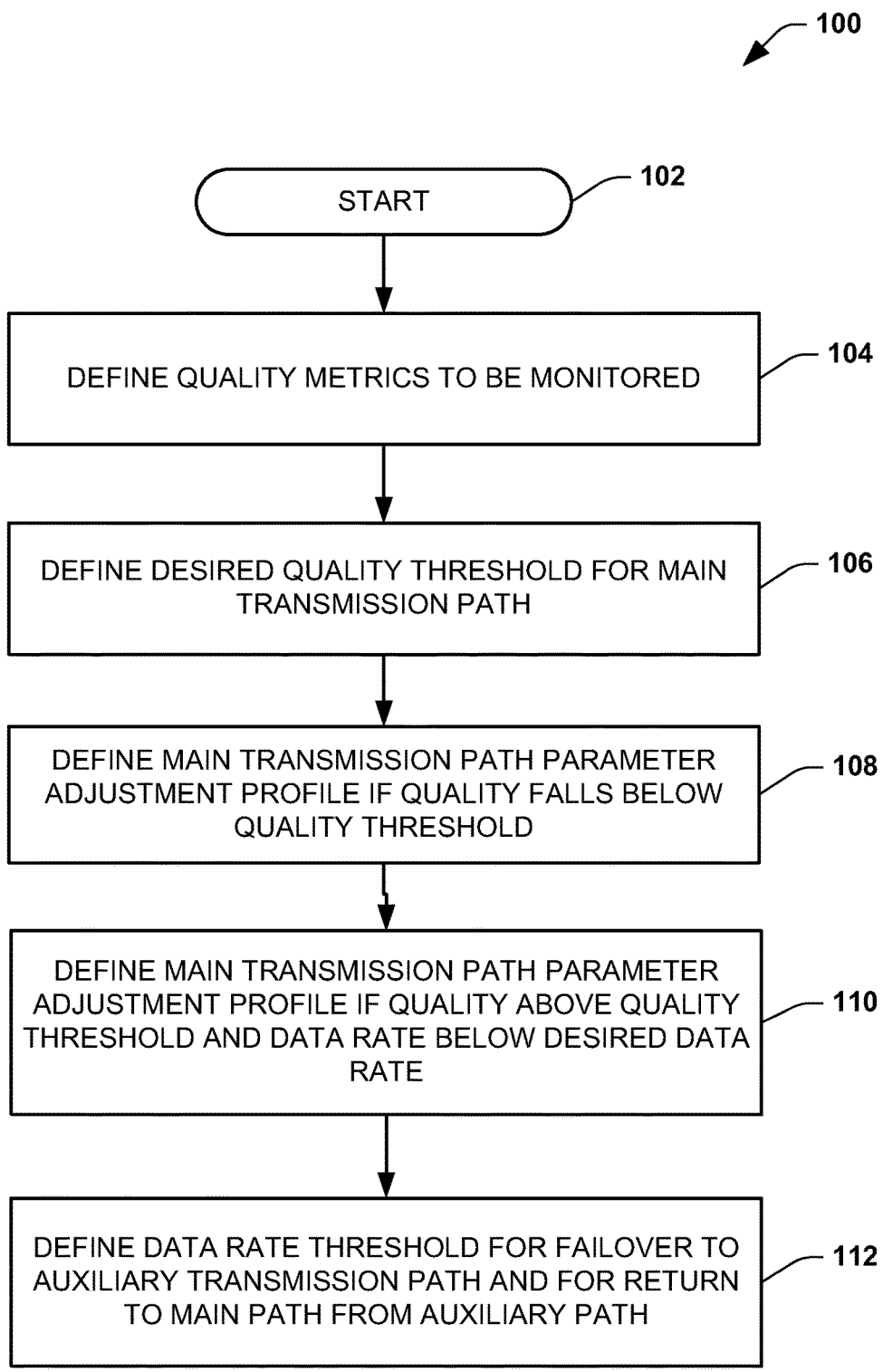
FIG. 3 illustrates a method for configuring an STL system for STL transmissions within a STL system according to an aspect of the invention.

In view of the structural and functional features described above, certain methods will be better appreciated with reference to FIGS. 2-3. It is to be understood and appreciated that the illustrated actions, in other embodiments, may occur in different orders or concurrently with other actions. Moreover, not all features illustrated in FIGS. 2-3 may be required to implement a method according to the subject invention. It is to be further understood that the following methodologies can be implemented in hardware (e.g., one or more processors, such as in a computer or computers), software (e.g., stored in a computer readable medium or as executable instructions running on one or more processors), or as a combination of hardware and software.

FIG. 2 depicts a basic flow diagram of a method (or process) 60 for STL transmissions within a STL system according to an aspect of the invention. The method 60 begins at 62 and proceeds to 64 in which encoded program content is transmitted from a STL transmitter to a STL receiver over a main transmission path. At 66, the STL transmitter receives quality metrics from the STL receiver based on the quality of the transmission over the main transmission path. As previously stated, the quality metrics could include BER and/or SNR metrics. However, alternative or additional quality metrics could be employed. The methodology then proceeds to 68. At 68, the STL transmitter determines if the quality metrics are above a first predetermined threshold (TH1). If the quality metrics are not above (i.e., below) the first predetermined threshold (NO), the methodology proceeds to 70 to adjust the main path transmission parameters to increase the quality level of the transmitted signal.

For example, the power can be increased to attempt to improve the link quality. Alternatively, and/or additionally, the channel payload data rate can be lowered, for example, by scaling down on the QAM modulation level and/or increasing the channel coding rate and/or reducing the amount of channels transmitted. Additionally, the sampling rate of the encoder can be decreased. The methodology then proceeds to 72. At 72, the STL transmitter determines if the data rate is below a second predetermined threshold (TH2), such as a user defined data rate for the auxiliary transmission path. For example, the second predetermined threshold can be a data rate threshold that is unacceptable for transmission. If the data rate is below the second predetermined threshold (YES), the methodology proceeds to 74 to transmit the encoded program content through the auxiliary transmission path. The methodology then returns to 66 to receive and check the quality metrics of the main transmission path with the first predetermined threshold. If the data rate is at or above the second predetermined threshold (NO), the methodology then returns to 64 to continue transmitting encoded program content through the main transmission path, and checking the received quality metrics.

Furthermore, if the quality metrics are at or above the first predetermined threshold (YES) at 68, the methodology proceeds to 76. At 76, it is determined if the payload data rate can be increased and/or if the payload data rate is below a desired payload data rate. If the payload data rate cannot be increased and/or is above a desired payload data rate (NO), then the methodology returns to 64 to continue transmitting encoded program content through the main transmission path, and checking the received quality metrics. If the payload data rate can be increased and/or is below a desired payload data rate (YES), then the methodology proceeds to 78 to increase the data rate. The channel payload data rate can be increased, for example, by scaling up the QAM modulation level and/or decreasing the channel coding rate and/or increasing the amount of channels transmitted. Additionally, the sampling rate of the encoder can be increased. The methodology then returns to 64 to continue transmitting encoded program content through the main transmission path, and checking the received quality metrics.

FIG. 3 depicts a basic flow diagram of a method (or process) 100 for configuring an STL system for STL transmissions within a STL system according to an aspect of the invention. The method 100 begins at 102 and proceeds to 104 where a user defines the quality metrics to be monitored by the STL system (e.g., at the STL receiver). At 106, the user defines a first desired quality threshold for the main transmission path. At 108, a user defines a main transmission path parameter adjustment profile if transmission quality falls below the desired first quality threshold. At 110, a user defines a main transmission path parameter adjustment profile if transmission quality is at or above the first desired quality threshold but the payload data rate is below a desired payload data rate. At 112, the user defines a second desired data rate threshold for failover to an auxiliary transmission path and for returning transmission to the main transmission path.

What have been described above are examples and embodiments of the invention. It is, of course, not possible to describe every conceivable combination of components or methodologies for purposes of describing the invention, but one of ordinary skill in the art will recognize that many further combinations and permutations of the present invention are possible. Accordingly, the invention is intended to embrace all such alterations, modifications and variations that fall within the scope of the appended claims. In the claims, unless otherwise indicated, the article "a" is to refer to "one or more than one."

What is claimed is:

1. A studio transmitter link (STL) system comprising:
    a STL transmitter comprising:
    a first STL transmitter interface that transmits program content over a first transmission path to a STL receiver; and
    a second STL transmitter interface that transmits program content over a second transmission path to the STL receiver.

2. The system of claim 1, wherein the first transmission path is a main transmission path and the second transmission path is an auxiliary transmission path, such that program content is transmitted over the main transmission path during normal transmissions and program content is transmitted over the auxiliary transmission path in the event of a failover condition of the main transmission path.

3. The system of claim 1, wherein the first transmission path is one of a radio frequency (RF) communication link and an Internet Protocol (IP) communication link and the second transmission path is the other of a RF communication link and an IP communication link.

4. The system of claim 1, the STL transmitter further comprising a transmitter control logic component that receives quality metrics associated with transmissions of program content and adjusts transmission parameters if the quality metrics associated with the transmission of program content is below a first predetermined threshold.

5. The system of claim 4, wherein the adjusting transmission parameters comprises at least one of increasing transmission power and reducing payload data rate.

6. The system of claim 5, wherein the reducing payload data rate comprises scaling down on the QAM modulation level and/or increasing the channel coding rate and/or reducing the amount of channels transmitted.

7. The system of claim 4, wherein the transmitter control logic component increases the payload data rate if the quality metrics associated with the transmission of program content is at or above the first predetermined threshold and not at a desired payload data rate.

8. The system of claim 4, wherein the first transmission path is a main transmission path and the second transmission path is an auxiliary transmission path, such that program content is transmitted over the main transmission path if quality metrics associated with the transmission of program content is at or above the first predetermined threshold and the data rate of the main transmission path is above a second predetermined threshold and program content is transmitted over the auxiliary transmission path if the data rate associated with the transmission of program content over the main transmission path is below the second predetermined threshold.

9. The system of claim 1, further comprising a STL receiver that comprises receiver control logic that determines quality metrics associated with the transmission of program content from the STL transmitter and one of transmits the determined quality metrics over a returned control path to the STL transmitter and determines which path to employ in decoding program content based on the determined quality metrics.

10. The system of claim 1, further comprising a user interface coupled to the STL system that allows a user to define at least one of quality metrics to be monitored, desired quality thresholds, parameter adjustment profiles and failover conditions.

11. A studio transmitter link (STL) system comprising:
a STL transmitter comprising:
- a first STL transmitter interface that transmits program content over a main transmission path to a STL receiver;
- a second STL transmitter interface that transmits program content over an auxiliary transmission path to the STL receiver, such that program content is transmitted over the main transmission path during normal transmissions and program content is transmitted over the auxiliary transmission path in the event of a failover condition of the main transmission path; and
- a transmitter control logic component that receives quality metrics associated with transmissions of program content and adjusts transmission parameters if the quality metrics associated with the transmission of program content is below a first predetermined threshold.

12. The system of claim 11, wherein main transmission path is one of a radio frequency (RF) communication link and an Internet Protocol (IP) communication link and the auxiliary transmission path is the other of a RF communication link and an IP communication link and the quality metrics are received over the IP communication link.

13. The system of claim 12, wherein the adjusting transmission parameters comprises at least one of increasing transmission power and reducing payload data rate and the transmitter control logic component increases the payload data rate if the quality metrics associated with the transmission of program content is at or above the first predetermined threshold and not at a desired payload data rate.

14. The system of claim 13, further comprising a STL receiver that comprises:
- a first STL receiver interface that receives program content over the main transmission path from the STL transmitter;
- a second STL receiver interface that receives program content over the auxiliary transmission path from the STL transmitter; and
- receiver control logic that determines quality metrics associated with the transmission of program content from the STL transmitter and one of transmits the determined quality metrics over a return control path to the STL transmitter and determines whether to decode program content received from the main transmission path or the auxiliary transmission path based on the determined quality metrics.

15. The system of claim 11, further comprising a user interface coupled to the STL system that allows a user to define at least one of quality metrics to be monitored, desired quality thresholds, parameter adjustment profiles and failover conditions.

16. A method of transmitting program content within a studio transmitter link (STL) system, the method comprising:
- transmitting program content from a STL transmitter to a STL receiver over a first transmission path; and
- transmitting program content from the STL transmitter to the STL receiver over a second transmission path in the event of a failover condition of the first transmission path, wherein the first transmission path is one of a radio frequency (RF) communication link and an Internet Protocol (IP) communication link and the second transmission path is the other of a RF communication link and an IP communication link.

17. The method of claim 16, further comprising:
- receiving quality metrics at the STL transmitter from the STL receiver over a return control path; and
- adjusting transmission parameters if the quality metrics associated with the transmission of program content is below a first predetermined threshold, wherein the adjusting transmission parameters comprises at least one of increasing transmission power and reducing payload data rate.

18. The method of claim 17, further comprising increasing the payload data rate if the quality metrics associated with the transmission of program content is at or above the first predetermined threshold and not at a desired payload data rate.

19. The method of claim 17, further comprising receiving quality metrics at the STL transmitter over the auxiliary path.

20. The method of claim 16, further comprising user defining at least one of quality metrics to be monitored, desired quality thresholds, parameter adjustment profiles and failover conditions to employed by the STL system.

* * * * *